Feb. 7, 1928.  
W. TISCH  
1,658,422  
FIBER BOX MAKING MACHINE  
Filed May 24, 1926  
5 Sheets-Sheet 2
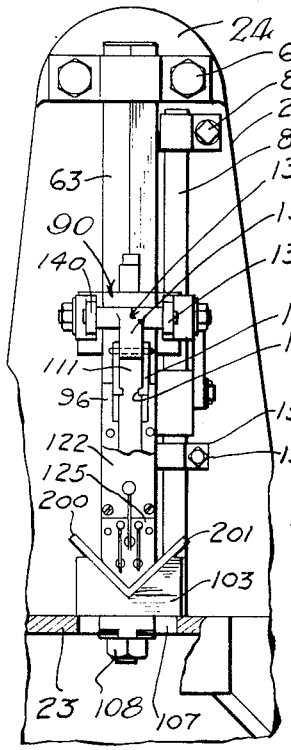
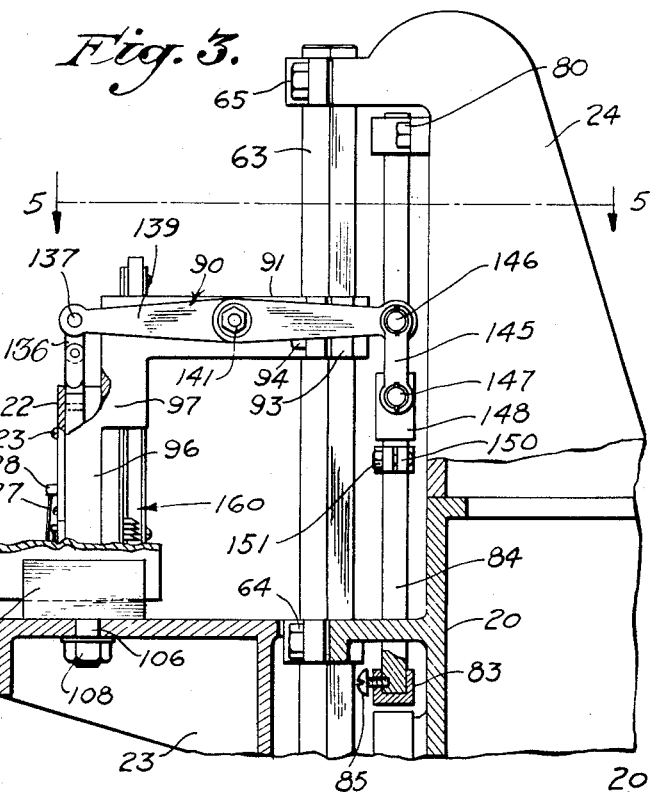
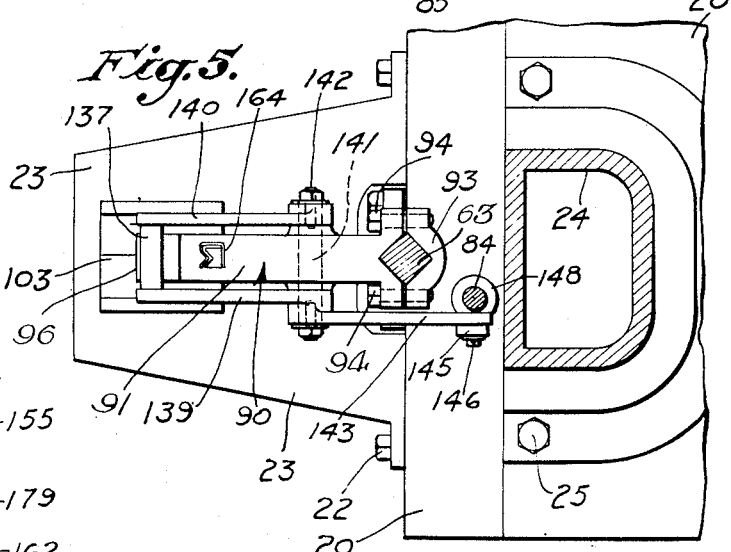
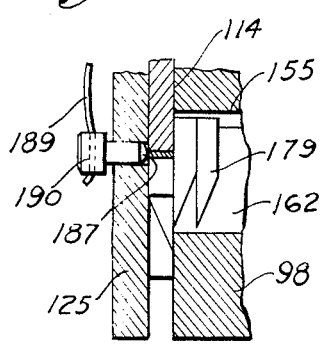
Fig. 3.
Fig. 4.
Fig. 5.
Fig. 15.
INVENTOR:  
WILLIAM TISCH,  
BY  
ATTORNEY Feb. 7, 1928.  
W. TISCH  
1,658,422  
FIBER BOX MAKING MACHINE  
Filed May 24, 1926   5 Sheets-Sheet 3
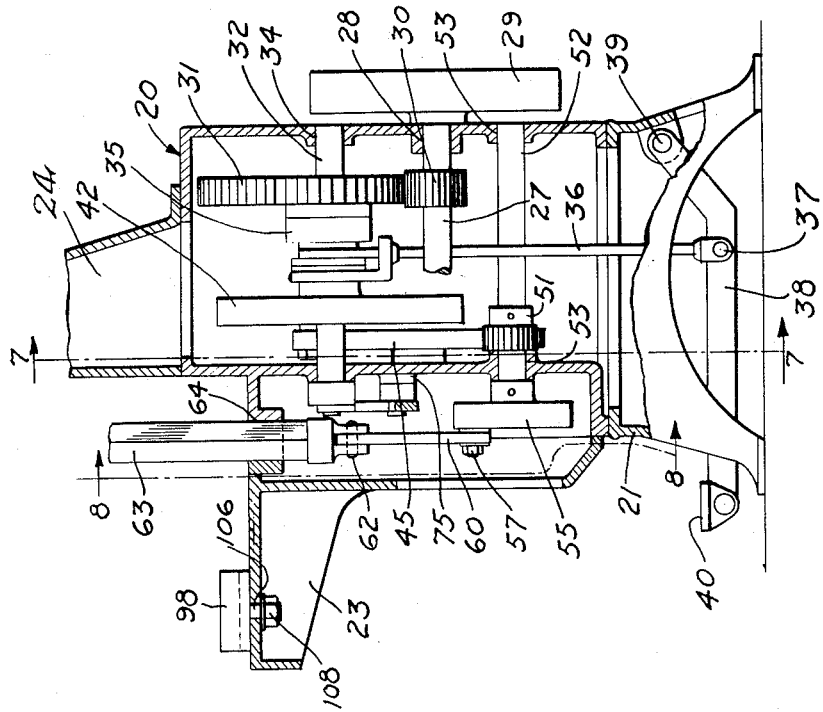
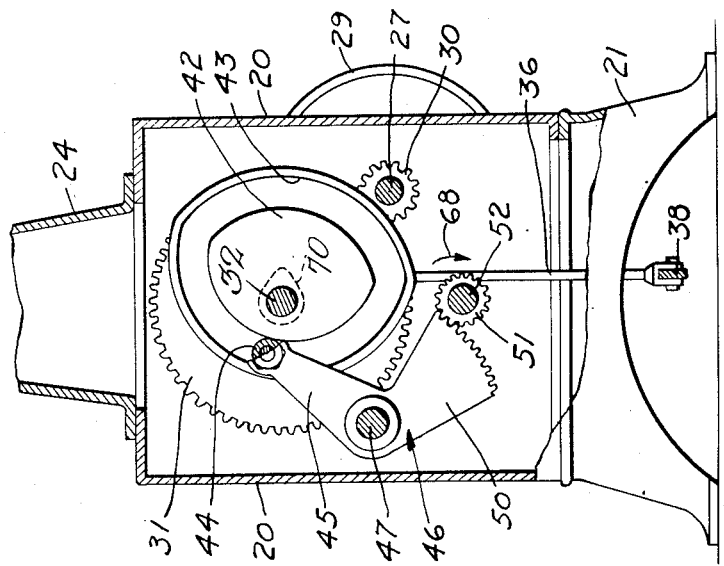
INVENTOR:  
WILLIAM TISCH,  
BY  
ATTORNEY.

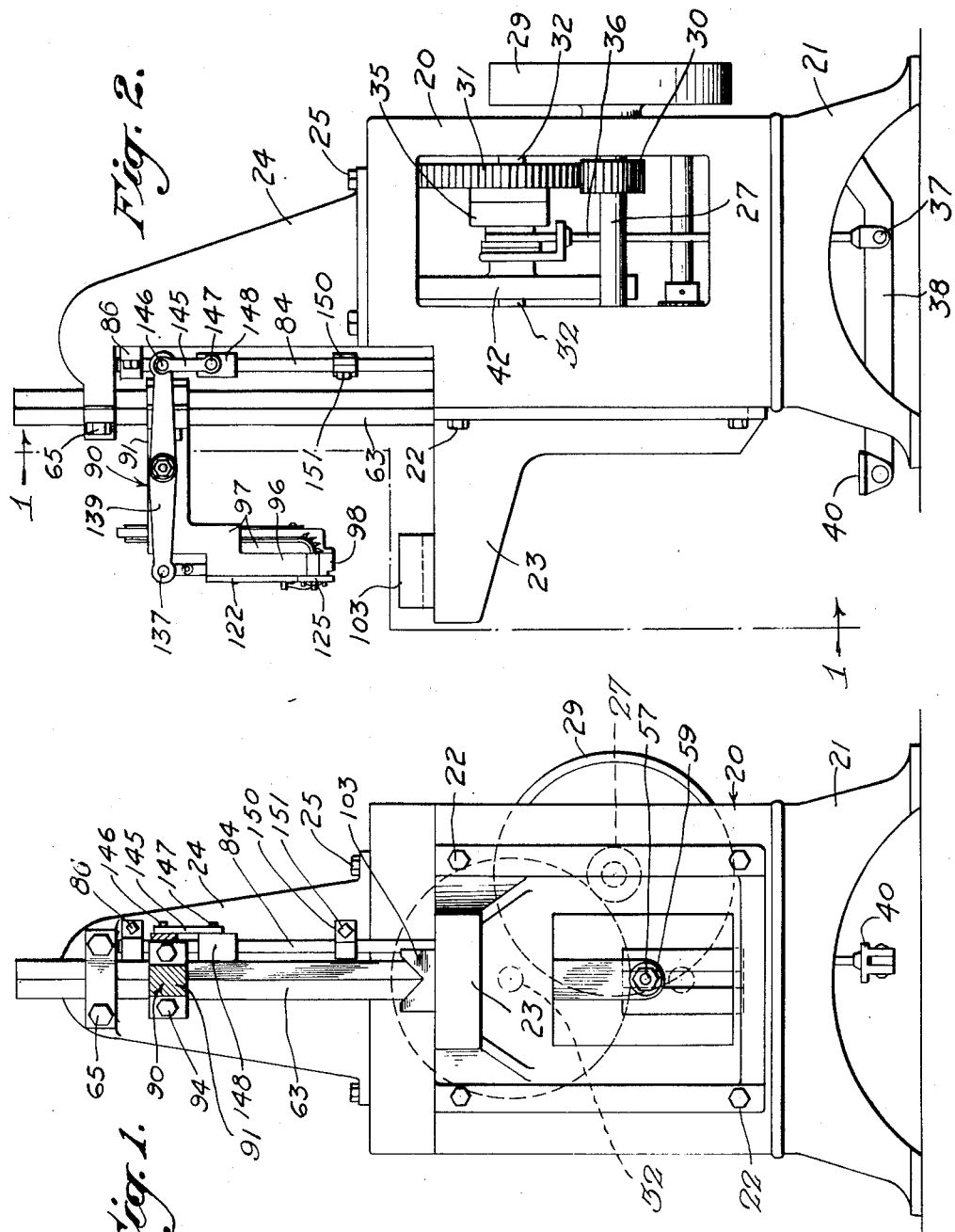

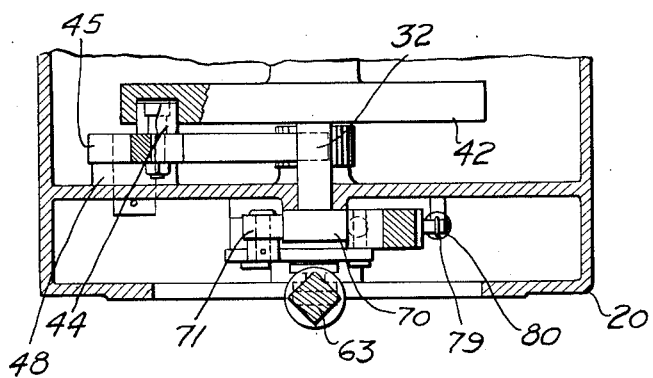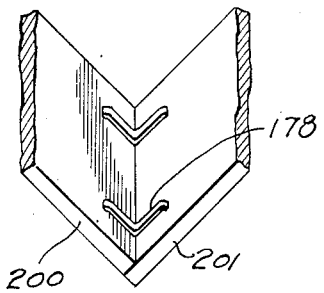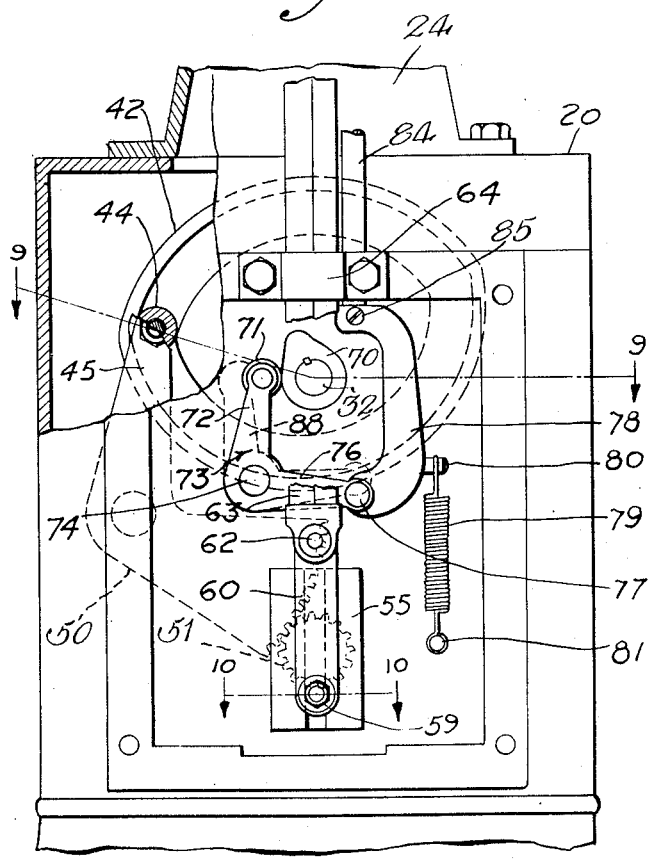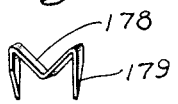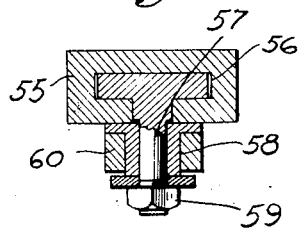

Feb. 7, 1928.

W. TISCH 1,658,422

FIBER BOX MAKING MACHINE

Filed May 24, 1926      5 Sheets-Sheet 5

INVENTOR:
WILLIAM TISCH,
BY
ATTORNEY.

Patented Feb. 7, 1928.

1,658,422

UNITED STATES PATENT OFFICE.

WILLIAM TISCH, OF GLENDALE, CALIFORNIA, ASSIGNOR TO MODERN FIBRE BOX CORPORATION, OF LOS ANGELES, CALIFORNIA, A CORPORATION OF CALIFORNIA.

FIBER-BOX-MAKING MACHINE.

Application filed May 24, 1926. Serial No. 111,466.

This invention relates to the box making industry and it relates particularly to a box making machine. In the ordinary box, the box members thereof are attached together by nails or other securing means which are inserted from the outside. I have found that a very strong and well formed box may be made if the securing means are inserted from the inside. The securing means which I employ in my invention is in the form of a staple which is secured at the juncture of the box members from the inside thereof or from the side of the smaller of two angles formed between each adjacent pair of box members.

It is accordingly one of the objects of this invention to provide a box making machine in which the securing means are inserted from the inside of the box members.

In certain types of boxes, such as cigar boxes, it is imperative that the inside measurements be quite accurate. In the ordinary form of box the liability of inaccuracies in the dimensions are quite large since the outer faces of the box members are manually held in contact with gauges which are intended to hold them in proper position for being secured in the ordinary box making machines. The box members are not clamped in place while they are being attached together and any warping or distortion of these members will affect the dimensions of the box.

I have found that by inserting the staples from the inside of the box members that the abutting ends thereof are pulled firmly together so that a box having accurate inside dimensions will be provided, if the box members have been cut to proper size. The box members are firmly clamped together in proper relative positions during the insertion of the staples so that there will be no distortion of the box members.

It is an object of this invention to provide a box making machine which will pull the edges of the box members snugly together.

It is another object of the invention to provide a box making machine which will firmly clamp the box members in proper relative positions during the attaching together of these members.

A still further object of this invention is to provide a box making machine having an improved staple feeding device.

It is also an object of this invention to provide a box making machine having novel means for holding a staple in position ready to be inserted in a pair of box members.

It is an object of this invention to provide a box making machine having a gripper which moves to grip and firmly hold a pair of box members in proper angular relationship so that these may be secured together, and having a hammer which inserts a staple at said joint of the pair of box members from the inside or the side of the smaller angle formed between said box members while they are firmly gripped by said gripper.

It is yet another object of this invention to provide a box making machine having a unique cam assembly for operating the gripper and hammer construction of the invention.

Other objects and particular advantages of the invention will be made manifest hereinafter.

Referring to the drawings in which I illustrate a preferred form of my invention, Fig. 1 is a vertical sectional view taken upon the line 1—1 of Fig. 2 and showing a box making machine embodying the features of this invention, the parts being in non-gripping position.

Fig. 2 is a side elevation of Fig. 1.

Fig. 3 is an enlarged view partially sectioned of the head structure of the invention. This view shows the parts in gripping position.

Fig. 4 is a front elevation of Fig. 3 partially in section.

Fig. 5 is a horizontal section taken on the line 5—5 of Fig. 3.

Fig. 6 is a substantially vertical section through the machine, the head structure thereof being broken away.

Fig. 7 is a section taken on the line 7—7 of Fig. 6.

Fig. 8 is a section taken substantially on the line 8—8 of Fig. 6.

Fig. 9 is a horizontal section taken on the line 9—9 of Fig. 8.

Fig. 10 is a section taken on the line 10—10 of Fig. 8.

Fig. 15 is a section taken on the line 15—15 of Fig. 14.

Fig. 16 is a perspective view showing the type of staple used in the box making of my invention.

Fig. 17 is a perspective view showing a pair of box members secured together by the box making machine of this invention.

Figure 11:
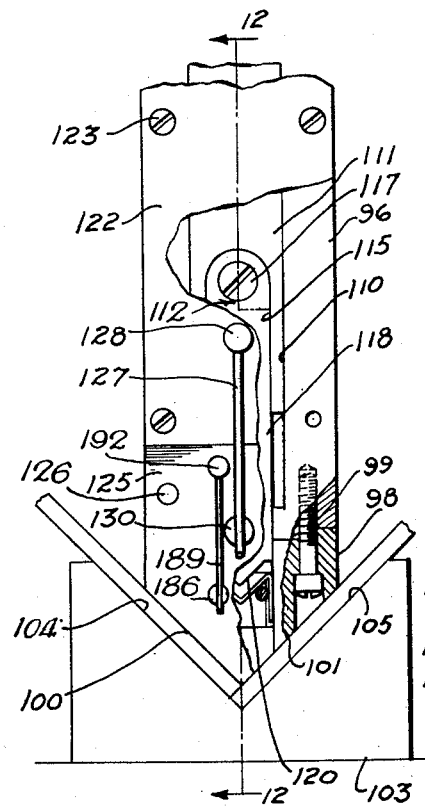
Fig. 11 is a fragmentary front view partially sectioned of the gripper of the invention, the gripper being shown in gripping position.

Referring particularly to Figs. 1 and 2 and 6 to 9 inclusive, the box making machine of my invention has a body casting 20 which is supported by a base 21. Secured to the front body casting 20 by cap screws 22 is a table 23 and secured to the upper part of the body casting 20 is a head casting 24, there being cap screws 25 for securing the head casting 24 in place. A power shaft 27 extends through the body casting 20 and is rotatably supported therein by bearings 28. One end of the power shaft 27 extends through the rear wall of the body casting 20 and has a drive pulley 29 secured thereto by means of which the power shaft 27 is rotated. A pinion gear 30 is secured to the power shaft 27 inside the body casting 20 and engages a gear 31 which is rotatably supported inside the body casting 20 on a cam shaft 32. The cam shaft 32 is rotatably supported by bearings 34 provided by the body casting 20. The gear 31 can be locked to the cam shaft 32 in order to drive it by means of a clutch construction 35. The clutch construction 35 has a rod 36 that extends downwardly from the body casting 20, and the lower end thereof is pivotally attached at 37 to a foot lever 38. The foot lever 38 is pivoted at 39 and the free end thereof is provided with a foot engaging shoe 40, by means of which the foot lever 38 may be operated. By depressing the foot lever 38, the rod 36 is moved downwardly and the clutch 35 is operated in order to lock the gear 31 to the shaft 32 for one rotation thereof.

Rigidly secured to the cam shaft 32 directly in front of the clutch construction 35 is a face cam 42. The face cam 42 is provided with a cam slot 43 in which a cam follower 44 operates. The cam follower 44, as illustrated best in Figs. 7 and 8, is secured to an upwardly extending arm 45 of a segment crank 46. The segment crank 46 is mounted on a shaft 47 which is supported by a bearing 48 (Fig. 9) of the body casting 20. The segment crank 46 is provided with a gear segment 50 which meshes with a pinion 51 secured on a crank shaft 52. The crank shaft 52, as shown best in Fig. 6, is rotatably supported in bearings 53 provided by the body casting 20. The forward end of the crank shaft 52 extends from the front wall of the body casting 20 and has a crank block 55 rigidly secured thereto. As illustrated clearly in Figs. 1, 8 and 10, the crank block 55 is provided with a T slot 56 which extends centrally across the axis of the crank shaft 52. Placed in the T slot 56 is the head of a T bolt 57 which has a bearing bushing 58 placed on the shaft part thereof. A nut 59 is screwed onto the T bolt 57 for securing it in a certain position in the T slot 56 and also for holding the bearing bushing 58 thereon. The lower end of a link 60 is pivoted on the bearing bushing 58 and an upper end of the link 60 is pivoted by a pivot pin 62 to the lower end of a slide bar 63. As illustrated best in Figs. 2, 6, 8 and 9 the slide bar 63 is square in cross section and is guided by a lower bearing 64 provided by the body casting 20 and an upper bearing 65 provided by the head 24.

When the cam shaft 32 is rotated, the face cam 42 rotates therewith. During one-half a revolution of the face cam 42 the segment crank 46 is moved from the position shown in Fig. 7 into the position shown in Fig. 8. The segment revolves the pinion gear 51 and rotates the crank shaft 52 in a direction indicated by the arrow 68 of Fig. 7. As will be noted from Fig. 1 and Fig. 8, which represent the two positions of the crank block 55, the crank block is rotated one-half a revolution only. This pulls the slide bar 63 downwardly from the upper position into lower position. The segment 46 is moved into the position shown in Fig. 8 during the first half of the revolution of the face cam 42. During the second half of the revolution the segment crank 46 is returned to the position shown in Fig. 7 and the pinion gear 51 is rotated half a revolution in the direction reverse to that indicated by the arrow 68. The crank block 55 is rotated in a reverse direction from the position shown in Fig. 8 into the position shown in Fig. 1 and the slide bar 63 is returned to upper position.

As illustrated best in Figs. 6, 8 and 9 the forward end of the cam shaft 32 extends through the front wall of the body casting 20 and has a cam 70 secured thereto. Adapted to follow the surface of the cam 70 is a follower 71 which is rotatably secured to a lever 72 of a bell crank 73. The bell crank 73 is supported by a shaft 74 carried by a bearing 75 formed in the front wall of the body casting 20. A horizontal arm 76 of the bell crank 72 is pivotally attached at 77 to the lower end of a yoke 78.

The yoke 78 is resiliently retained in a lower position by means of a coil spring 79 which engages a pin 80 of the yoke 78 and a pin 81 carried by the body casting 20. The upper end of the yoke 78 (Fig. 3) is provided with a socket 83 into which the lower end of a slide rod 84 extends. The slide rod 84 is secured in the socket 83 of the yoke 78 by means of a screw 85. The slide rod 84 is slidably carried at its upper end by a bearing 86 which is secured to the head casting 24.

When the cam shaft 32 is rotated, the cam 70 moves the bell crank 73 from the position shown in full lines in Fig. 8 into a position indicated by dotted lines 88. The yoke 78 and the guide bar 84 are moved with the bell crank 73 from their lower full line position on the shaft 32 into an upper position. The cam 70 is so positioned that the segment crank 46 is first moved into the position shown in Fig. 8 before the bell crank 73 is operated. Also the bell crank 73 returns to the position shown in full lines in Fig. 8 before the segment crank 46 is returned from the position shown in Fig. 8 to the position shown in Fig. 7.

A gripper head 90 has a horizontal arm 91 which is secured to the upper end of the slide bar 63 between the bearings 64 and 65 by means of a clamp plate 93 which surrounds the slide bar 63 and is secured to the horizontal arm 91 of the gripper head 90 by cap screws 94. At the forward end of the horizontal arm 91 is a vertical gripper arm 96 which is joined to the horizontal arm 91 by an offset portion 97. Secured to the lower end of the gripper arm 96 is a gripper 98, the gripper 98 being secured to the gripper arm 96 by machine screws 99. The lower end of the gripper 98 is V-shaped and has faces 100 and 101 which are in planes which are at right angles to each other. Placed directly below the gripper 98 is an anvil 103 which rests on the table 23. The anvil 103 is provided with a V-shaped channel which has faces 104 and 105 which extend at right angles to each other. Extending downwardly from the anvil 103 is a stud 106 which extends through a transverse slot 107 formed in the upper wall of the table 23. A nut 108 is screwed onto the lower end of the stud 106. The stud and slot arrangement is provided so that the anvil 103 may be accurately centered below the gripper 98, as will be described later.

Figure 14:
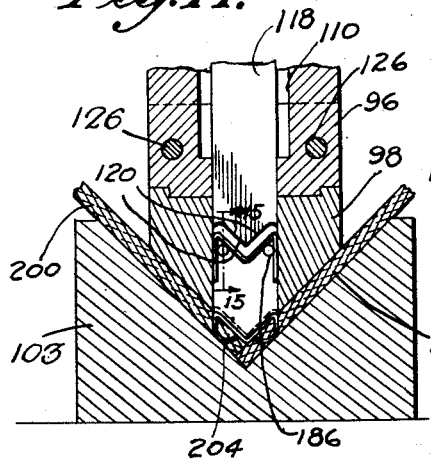
Fig. 14 is a section taken on the line 14—14 of Fig. 13.

The lower part of the gripper arm 96 is provided with a vertical channel 110 which is formed in the front face of the gripper arm. The channel 110 connects with the upper end of the arm 96 but terminates a short distance above the lower end thereof. Adapted to reciprocate in the channel 110 is a bar 111 of a hammer 112. Formed in the extreme lower part of the gripper arm 96 and in the gripper 98 is an opening in the form of a slot 114. This slot 114 is not as wide and not as deep as the channel 110 and connects the channel 110 to the lower end of the gripper 98. The lower end of the bar 111 is provided with a recess 115 which is formed in the front face and at the lower end thereof. Secured in the recess 115 by means of a machine screw 117 is a head-piece 118 of the hammer 112. The lower part of the head-piece 118 is provided with faces 120 which extend substantially at right angles to each other and form a V. The outer ends of the faces 120 are curved as illustrated in Figs. 11 and 14.

The front of the channel 110 and the slot 114 is covered by a plate 122 which is secured in place by machine screws 123. A lower part 125 of the plate 122 is made separately removable so that access to the slot 114 may be had. The part 125 is provided with dowel pins 126, as shown best in Fig. 13, which extend into openings provided in the lower end of the gripper arm 96. A spring 127 which is secured to a pin 128 of the plate 122 engages a head 130 attached to the part 125. This spring 127 presses the part 125 against the front face of the gripper arm 96 and the gripper 98. As shown in the drawings the part 125 extends to the lower end of the gripper 98 and is also V-shaped.

The upper end of the bar 111 of the hammer 112 is provided with horizontal grooves 133 into which the lower ends of attachment plates 134 extend. The lower parts of these attachment plates extend into slots formed on each side of the upper end of the channel 110. The upper ends of the attachment plates 134 are pivotally secured to a vertical arm 136 of a T member 137. The lower end of the vertical arm 136 is rounded and has a bearing in a rounded upper face of the bar 111. The vertical arm 136 is held in engagement with this rounded face of the bar 112 by means of the attachment plates 134. The T member 137 has a lever 139 and a lever 140 pivoted thereto. The levers 139 and 140 are secured to a shaft 141 which extends through the horizontal arm 91 of the gripper head 90 by means of bolts 142. The arm 139 is dissimilar to the arm 140 and is provided with a rearwardly extending portion 143 to which the upper end of a link 145 is pivotally secured by a pivot pin 146. The lower end of the link 145 is pivoted on a pivot pin 147 of a slide bearing 148. The slide bearing 148 surrounds the slide rod 84 in position above an engager collar 150 which is clamped in any position on the slide rod 84 by means of a cap screw 151.

Figure 12:
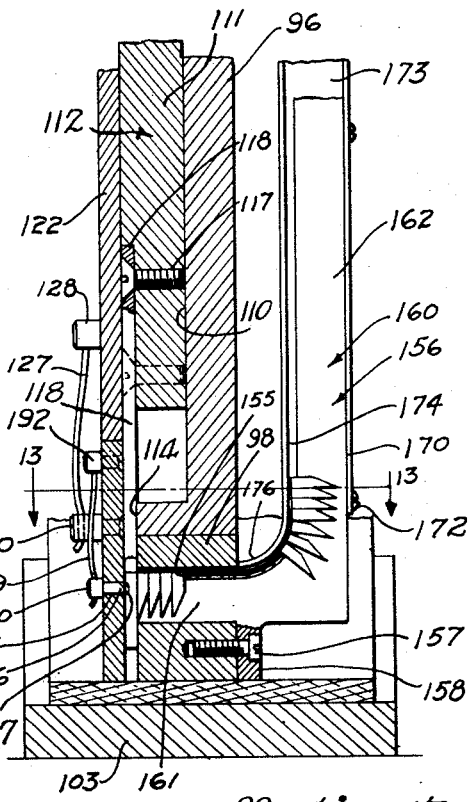
Fig. 12 is a section taken on the line 12—12 of Fig. 11.

When the slide rod 84 is moved upwardly, the slide bearing 148 is engaged and moved upwardly in a manner to swing the rear part 143 of the lever 139 upwardly. This swings the forward end of the lever 139 and also the forward end of the lever 140 downwardly and the T member 137 is moved downwardly therewith. Since the T member 137 is in engagement with the upper end of the bar 111 the hammer 112 is moved downwardly from the position shown in Figs. 11 and 13 so that the lower end of the head-piece 118 occupies a position at the extreme lower end of the gripper 98. The gripper 98, as illustrated best in Fig. 12, is provided with a horizontal opening 155 which communicates with the slot 114 directly below the lower end of the head-piece 118 when it is in upper position and also communicates with a rear face of the gripper.

Figure 13:
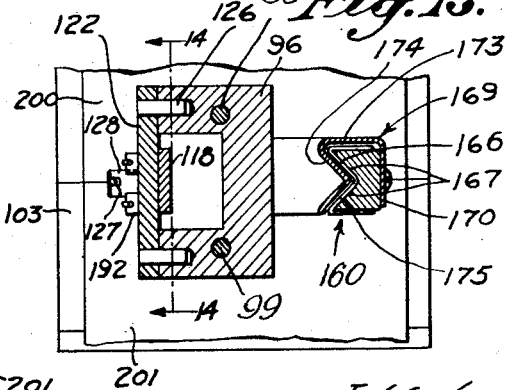
Fig. 13 is a section taken on the line 13—13 of Fig. 12.

A feed mechanism 156 is secured to the gripper 98 by cap screws 157 which extend through a flange 158 of a body 160 of the feed mechanism 156. The body 160 has a horizontal portion 161 which extends into the opening 155 of the gripper 98, the forward end thereof terminating at the back face of the slot 114. The body also has a vertically extending portion 162 which extends upwardly directly adjacent to the gripper arm 96. The upper end of the vertical part 162 extend through an opening 164 which is provided vertically through the offset portion 97 of the gripper head 90. The width of the body 160 is not as great as the width of the opening 155 in the gripper 98 and the height of the portion 161 which extends through the opening 155 is not as high as the opening 155 so there is therefore a space between the upper face of the portion 161 and the upper face of the opening 155. The upper face of the portion 161 and the forward face of the vertical portion 162 is provided, as illustrated in Fig. 13, with a V channel 166 which is formed by faces 167 which extend at right angles to each other. The V channel 166 extends entirely along the vertical portion 162 and the horizontal portion 161 of the body 160. Where the horizontal and vertical portions come together, the V channel 166 is rounded as suggested in Fig. 12.

Referring to Fig. 13 the feed mechanism 156 is provided with a guide strip 169. The guide strip 169 has a flange 170 which engages the back face of the vertical portion 162 of the body 160 and is secured thereto by screws 172. Extending forwardly from the flange 170 at one side of the portion 162 and a short distance therefrom is a side 173. Formed integrally with the side 173 is a V-shaped portion 174 which extends symmetrically into the V channel 166. The angles of the walls of the V-shaped portion 174 are the same as the angles of the face 167. A space is left between the faces 167 and the V-shaped portion 174 so that a V-shaped channel 175 is provided. The lower end of the V-shaped portion 174 is curved at 176 to accommodate the shape of the body 160 and terminates where the body 160 enters the opening 155 in the block 98.

The feed mechanism 156 is adapted to feed staples such as is typically illustrated in Fig. 16, into the slot 114 directly below the head-piece 118. The staples each consists of a V-shaped head 178 from the opposite edges of which there extend legs 179, which are parallel. The staples are fed into the upper end of the feed mechanism. I intend to employ automatic means for inserting the staples into the upper end of the feed mechanism 156, but since that is not a part of this invention, it has been left off. The V-shaped heads 178 of the staples rest in the V-shaped channel 175, as illustrated best in Figs. 12 and 13. The legs 179 extend on opposite sides of the body 160. The weight of the staples in the vertical part of the feed mechanism 156 forces the staples by gravity into the slot 114 so that there is always a staple in place when the hammer 112 is in raised position.

In order to prevent the staple resting in the slot 114 from dropping downwardly from position I provide an arrangement as illustrated best in Figs. 12, 14 and 15. Openings 181 are formed in the part 125. Extending through these openings 181 are pins 186. The inner ends of these pins 186 are rounded as indicated at 187 and extend but a short distance into the slot 114. These pins 186 are positioned as illustrated in Fig. 14 so that the inner ends thereof are engaged by the outer parts of the V-shaped head 187 of the staple which is at that time resting in the slot 114. The pins 186 are yieldably held in the position shown in Figs. 12 and 14 by spring members 189 which engage heads 190 thereof. These spring members are secured to the part 125 by pins 192. The pins 186 are made yieldable so that the staple may be forced thereby by the head-piece 118 of the hammer 112 when the device is operated. When the head-piece 118 returns to the position shown in Fig. 12 the pins 186 return from the position shown in Fig. 15 into the position shown in Fig. 12 to support another staple when it is forced into the slot 114 by gravity.

The operation of my invention is substantially as follows:

The parts when in normal position are in the positions illustrated in Fig. 2 and the other figures which correspond thereto. The operator of the machine places a pair of box members 200 and 201 into the channel of the anvil 103 so that they engage the faces 104 and 105 thereof, respectively. The box members are placed as illustrated best in Figs. 11 and 14. These parts are manually held in position and the operator depresses the foot lever 38 and locks the gear 31 to the cam shaft 32. This revolves the plate cam, as previously described, and swings the segment crank 46 from the position shown in Fig. 7 into the position shown in Fig. 8. This operates the parts as previously described and moves the slide bar 63 downwardly to lower position. The gripper head, since it is secured to the slide bar 63, moves downwardly therewith into the position shown in Figs. 3, 4, 11, 12 and 14, and the lower faces 100 and 101 of the gripper 98 engage the box members 200 and 201 and firmly clamp them in the positions shown best in Figs. 11 and 14. It is pointed out that the gripper 98 holds the box members 200 and 201 firmly in proper angular relationship and in the proper position to be secured together by the staples. When the gripper 98 moves into gripping position the operator is no longer required to manually hold the box members 200 and 201 in place.

After the gripper has been moved into gripping position and is firmly holding the box members 200 and 201, the bell crank 73 is moved by the cam 70 from the position shown by full lines in Fig. 8 into the position shown by dotted lines 88 in Fig. 8. This moves the slide rod 84 upwardly, as previously explained. The engager collar 50 moves upwardly with the slide rod 84 and engages the slide bearing 48. The slide bearing 48 in turn operates the levers 139 and 140 by means of the interconnecting link 145. The hammer 112 is thereby moved downwardly from the position shown in Figs. 11, 12 and 14 into operated position in which the lower end of the head-piece 118 rests at the extreme lower end of the slot 114. As the head-piece 118 moves downwardly, the faces 120 engage the V-shaped head 178 of the staple which is at that time resting in the slot 114. The staple is forced downwardly thereby and the supporting pins 186 are forced into the positions illustrated in Fig. 15. The legs 179 of the staple are forced through the box members 200 and 201 and when the ends thereof comes into contact with the faces 104 and 105 of the anvil 103 they are bent inwardly, as indicated at 204 in Fig. 14. The staple is forced downwardly by the head-piece 118 until the V-shaped head 178 of the staple engages the inner faces of the box members 102 or is slightly embedded therein as desired. It is pointed out that the inward bending of the legs 179 of the staple tends to pull the box members 200 and 201 downwardly so that the contacting faces thereof are brought snugly into engagement with each other.

The next operation is to return the hammer 112 to raised position and this occurs, as previously described, before the gripper 98 is moved from gripping position. When the head-piece 118 returns to raised position, the supporting pins 186 return from the positions illustrated in Fig. 15 into positions illustrated in Figs. 11, 12 and 14. Also another staple will be moved by gravity into the slot 114 and will be supported therein by the pins 186 in position to be inserted by the head-piece 118 of the hammer 112. After the hammer has been returned to raised position the parts of the machine operate to return the gripper head to raised position and to disengage the gripper 98 from the box members 200 and 201. This returning of the gripper head is accomplished as previously described. When one complete revolution of the cam shaft 32 has occurred, the machine will be at rest until the foot lever 38 is operated.

Before starting up the machine it may be necessary to adjust the different parts and different strokes of the machine. It is necessary in the first place to have the anvil 103 accurately centered below the gripper 98. This adjustment is accomplished by lowering the gripper head into gripping position and then loosening the nut 108 so that the anvil may be slipped into proper position. It may also be necessary to adjust the gripping position of the gripper head so that a proper pressure of the gripper 98 on the box members 200 and 201 may be had. The lower position of the gripper head may be adjusted by adjusting the position of the gripper head 90 on the slide bar 63 which may be accomplished when the cap screws 94 are loosened. Another manner of adjusting the lower position of the gripper head 98 is to adjust its length of stroke. This may be done by loosening the nut 59 and changing the position of the T bolt 57 in the T slot 56 of the crank block 55. Another adjustment which may be made is the adjustment of the lower position of the hammer so that a staple will be inserted properly. In some instances it may be desirable to embed the V-shaped head of the staple into the inner faces of the box members. At other times it may be desirable to have the V-shaped head rest on the surface of the box members. However, this lower position may be adjusted by changing the position of the engager collar 150 on the slide rod 84, this being done after the cap screw 151 is loosened. If it is desired to lower the lower portion of the hammer 112, the collar 150 is moved upwardly on the slide rod 84, and if it is desired to raise the lower portion of the hammer 112 the collar 150 is lowered on the slide rod 184. In event that there should be any jamming of a staple in the slot 114, the jammed staple may be very easily removed by removing the part 125 of the plate 122, this plate being resiliently held in place and quickly removed.

From the foregoing description it will be seen that the machine of my invention accomplishes all of the objects hereinbefore set forth. A box made by the machine of my invention will be absolutely accurate both in size and in shape. The size of the box will be accurate because all of the box members are brought into snug engagement with each other so that the dimensions must all be correct. The shape of the box will be accurate because the box members are all held in the correct position during the attaching of them together.

I claim as my invention:

1. In a box making machine of the class described, the combination of: an anvil, said anvil being adapted to support a pair of box members; a gripper adapted to engage and hold said box members in proper relative position for being secured together; and a hammer adapted to insert a securing member from the side of the smaller of two unequal angles formed between said box members while they are engaged by said gripper for securing them together.

2. In a box making machine of the class described, the combination of: an anvil, said anvil being adapted to support a pair of box members; a gripper adapted to engage and hold said box members in proper relative position for being secured together and so as to form two unequal angles, said gripper engaging said box members on the side of the smaller angle; and a hammer adapted to insert a securing member from the side of the smaller angle of said box members while they are engaged by said gripper for securing them together.

3. In a box making machine of the class described, the combination of: an anvil, said anvil being adapted to support a pair of box members; a gripper adapted to engage and hold said box members in proper relative position for being secured together; and a hammer carried by said gripper adapted to insert a securing member from the side of the smaller of two unequal angles formed between said box members while they are engaged by said gripper for securing them together.

4. In a box making machine of the class described, the combination of: an anvil, said anvil being adapted to support a pair of box members; a gripper adapted to engage and hold said box members in proper relative position for being secured together and so as to form two unequal angles, said gripper engaging said box members on the side of the smaller angle; and a hammer carried by said gripper adapted to insert a securing member from the side of the smaller angle of said box members while they are engaged by said gripper for securing them together.

5. A box making machine comprising: an anvil adapted to support a pair of box members; a gripper adapted to engage said box members and hold them in proper position for being secured together and so as to form two unequal angles; staple feeding mechanism for feeding staples into an opening in said gripper; and a hammer carried by said gripper, said hammer being adapted to engage a staple disposed in said opening and to insert it in said box members from the side of the smaller angle while said gripper is engaging said box members for securing them together.

6. A box making machine comprising: an anvil adapted to support a pair of box members; a gripper adapted to engage said box members and hold them in proper position for being secured together and so as to form two unequal angles; staple feeding mechanism for feeding staples into an opening in said gripper; a hammer carried by said gripper, said hammer being adapted to engage a staple disposed in said opening and to insert it in said box members from the side of the smaller angle while said gripper is engaging said box members for securing them together; and a pair of yieldable pins extending into said opening for supporting a staple therein, said pins being forced from said opening when the staple is inserted by said hammer.

7. A box making machine comprising: an anvil adapted to support a pair of box members; a gripper adapted to engage said box members and hold them in proper position for being secured together and so as to form two unequal angles; staple feeding mechanism for feeding staples into an opening in said gripper, said staple feeding mechanism having a body having a V channel formed therein and a V-shaped guide strip extending symmetrically inward into said V channel and spaced a small distance from the walls of said V channel; and a hammer carried by said gripper, said hammer being adapted to engage a staple disposed in said opening and to insert it in said box members from the side of the smaller angle while said gripper is engaging said box members for securing them together.

8. A box making machine comprising: an anvil adapted to support a pair of box members; a gripper adapted to engage said box members and hold them in proper position for being secured together and so as to form two unequal angles; staple feeding mechanism for feeding staples into an opening in said gripper, said staple feeding mechanism having a body having a V channel formed therein and a V-shaped guide strip extending symmetrically inward into said V channel and spaced a small distance from the walls of said V channel; a hammer carried by said gripper, said hammer being adapted to engage a staple disposed in said opening and to insert it in said box members from the side of the smaller angle while said gripper is engaging said box members for securing them together; and a pair of yieldable pins extending into said opening for supporting a staple therein, said pins being forced from said opening when the staple is inserted by said hammer.

In testimony whereof, I have hereunto set my hand at Los Angeles, California, this 19th day of May, 1926.

WILLIAM TISCH.